July 28, 1959   G. SCHWESINGER   2,896,504
OPTICAL SYSTEM FOR NON INTERMITTENT MOTION PICTURES
Filed Feb. 20, 1958
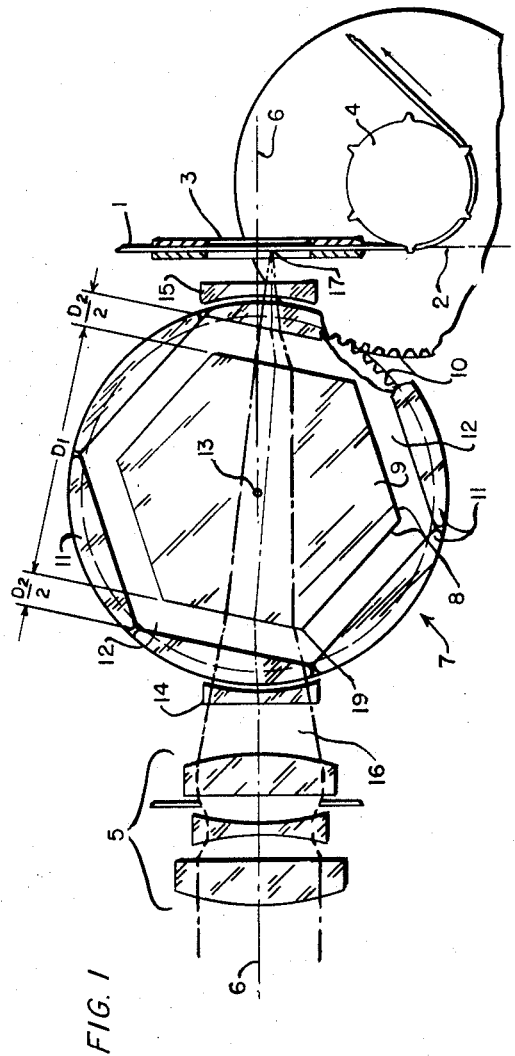
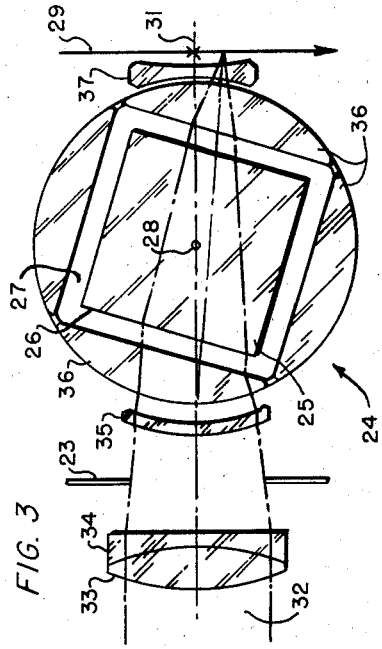
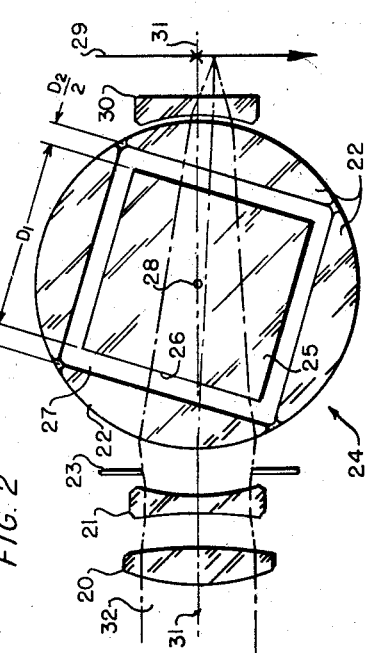
INVENTOR,
GERHARD SCHWESINGER.
BY
Harry M. Saragovitz
ATTORNEY.

United States Patent Office 2,896,504
Patented July 28, 1959

2,896,504

OPTICAL SYSTEM FOR NONINTERMITTENT MOTION PICTURES

Gerhard Schwesinger, Heidenheim (Brenz), Germany, assignor to the United States of America as represented by the Secretary of the Army Application February 20, 1958, Serial No. 716,519

3 Claims. (Cl. 88—16.8)

(Granted under Title 35, U.S. Code (1952), sec. 266)

The invention described herein may be manufactured and used by or for the Government for governmental purposes without the payment of any royalty thereon.

This invention relates to an optical system for making motion pictures on conventional motion picture film and is also adapted for projecting the picture from the film strip after it has been processed. The invention is particularly directed to taking or projecting high quality moving pictures in an apparatus designed to feed the film continuously in distinction to the conventional type of apparatus wherein the film strip is fed intermittently from one frame to the next.

The production of a motion picture which presents a normal reproduction of the subject upon a screen while the film strip moves uninterruptedly requires the introduction of a compensating device to control the beam of light at a position between the image forming lens and the film, as disclosed in Patent No. 2,769,367, dated November 6, 1956, to Gerhard Schwesinger for "Device for Compensating Optical Image Motion."

An object of this invention is to provide an improvement over the structure disclosed in the above-mentioned Patent No. 2,769,367.

Another object of the invention is to reduce the number of optical elements required for the compensating device of the above-mentioned patent.

Other objects and features of the invention will become apparent to those skilled in the art as the disclosure is made in the following detailed description of the invention as illustrated in the accompanying sheet of drawing in which;

Figure 1 is a diagrammatic view of the device disclosed in the said Patent No. 2,769,367.

Figure 2 is a diagrammatic view of one embodiment of this invention.

Figure 3 is a diagrammatic view of a second embodiment of this invention.

Referring to the drawing, Figure 1 shows schematically an optical system embodying the invention of the said Patent No. 2,769,367, wherein the conventional film strip 1 is guided in any suitable manner in the focal plane 2 of the system adjacent to the film gate 3. The film is driven in any suitable manner at constant speed such as by means of a sprocket 4 which engages the film performations. A lens 5, a triplet, for example, is provided for forming the image and when the invention is employed as a projector a suitable light source is provided for illuminating the gate 3. A compensator indicated at 7 is interposed in the path of the light passing between the film and the lens.

The compensator is rotated in the proper direction and at a speed synchronized with the speed of travel of the film. The speed of the compensator is fixed by the number of pairs of parallel faces 8 upon the glass prism 9. The timing of the mechanism must be such that one frame of the film strip must pass the gate 3 each time a pair of faces on the prism passes through its active cycle. For each pair of faces 8, a pair of plano convex lenses 11 are provided which are permanently mounted with their plane faces facing, parallel to and spaced from each prism face thereby to provide equal air space 12 between the prism face and the lens. The air spaces 12 constitute one element of the double element refractor, each space having a value $$\frac{D_2}{2}$$

while the prism 9 has a thickness $D_1$. Each of the six faces of the prism has an identical cooperating lens 11 fixed in position with respect to prism faces in the manner above described. The centers of curvature of all the lenses 11 coincide with axial lines drawn normal to the faces 8 and passing through the axis of rotation 13 about which the assembled element 7 rotates. The convex faces of the lensese 11 all have a curvature equal to the axial distance therefrom to the axis 13. The curvature of the external faces of the six lenses 11 thus conform to the circle having its center at the axis 13.

The assembly 7 is desirably secured to one of the gears in the gear train 10 and the mechanism is driven in any suitable manner at a speed suitable to the subject matter being portrayed.

In addition to the rotating element 7 the invention provides a pair of stationary plano concave lenses 14 and 15 positioned with their centers of curvature upon the axis 6 coinciding with the axis of the lens 5 and the center of the film gate and with their concave faces closely adjacent to the convex faces of the lenses 11. The spacing should be just sufficient to permit the member 7 to rotate without touching the lenses 14 and 15. The curvature of the plano concave lenses is determined by the radius therefrom to the axis 13. In other words the centers of the sperical surface of all the lenses above described coincide at the axis 13.

The group of lenses 11, 14 and 15, provide the means whereby the condition is achieved wherein the compensator is composed of elements which have an effect equivalent to that which would be provided by a compensator having one element whose index of refraction is greater than one and another element whose index of refraction is less than one, as fully explained in the said patent.

Considering now the effect of the above group of lenses upon the lateral shift of the image beam 16, attention is directed to the action of adjacent lenses 11 and 14 which considered together form a wedge which varies its angle as the member 7 rotates. An identical variable wedge is also formed by adjacent lenses 11 and 15. The refractive indices of the lenses are the same and will be designated $N_0$. The refractive index of prism 9 is designated $N_1$ where $N_1$ is substantially greater than $N_0$.

In operation when the wedge formed by lenses 11 and 14 is increasing its angle the wedge formed by the lenses 11 and 15 is increasing its angle at the same rate. Consequently the beam displacing effect of the two variable wedges in effect cancels out and therefore has no ultimate effect on the lateral displacement of the image. Only the tilted prisms in conjection with the air spaces 12 produce the required image shift.

From the above it will be apparent that the relative refractive indices which determine the magnitude of the image shift are respectively $$n_1 = N_1/N_0$$
$$n_2 = 1/N_0$$

It appears from the second expression the $n_2$ is in fact, a quantity smaller than unity. Since prism 9 is of a highly refracting material of refractive index $N_1$, substantially greater than $N_0$, $n_1$ is greater than 1.

While in the above invention the compensator and the image forming lens are separate units, this invention combines these two units so that the number of optical elements is reduced with a resultant simplification of the overall system. The result is achieved by designing the system so that certain elements of the lens form components of the compensator with the result that one or both of the variable wedges which are esssential components of the new compensator are absent as distinct physical elements though still present optically inasmuch as rotating lenses effect prismatic refraction of variable degree in addition to spherical refraction.

More specifically, a lens of triplet type is designed with the third element being plano-convex, having a refractive index of $N_0$ and a plane rear surface. In addition, the compensator to be used in conjunction with the triplet lens is designed to have plano-convex lenses identical with the third element of the triple and rotating above the center of curvature of the convex surface. In other respects the system is identical with that of the said patent, i.e., the same as Figure 1 of this application.

Figure 2 discloses one embodiment of this invention. The triplet lens comprises elements 20, 21 and 22, the third element 22 being to the right of diaphragm 23 and having a refractive index $N_0$. The third element 22 further comprises an element of the compensator designated generally as 24. Compensator 24 is structurally the same as compensator 7 of Figure 1 although the prism 25 is shown to have four sides rather than six in order to simplify the figure. Prism 25 has a refractive index $N_1$, substantially greater than $N_0$. Each lens 22 of Figure 2 is permanently mounted with its plane rear surface facing, parallel to and spaced from each face 26 of prism 25 to provide equal air spaces 27 between each prism face and each lens 22. The air spaces constitute one element of a double element refractor, each air space having a thickness $$\frac{D_2}{2}$$

while the prism has a thickness $D_1$. The center of curvature of the convex surface of each lens 22 is at 28, on the axis of rotation of the compensator so that the curvature of the external faces of lenses 22 conforms to a circle having its center at 28, as in the compensator of said Patent No. 2,769,367.

The compensator 24 and the film, shown diagrammatically at 29, are driven in the manner disclosed in Figure 1 of this application, the driving shaft, gears and the like being omitted from Figure 2 for simplicity. To complete the system a plano-concave lens 30 of refractive index $N_0$ is positioned on the optical axis 31 of the system with its concave face closely adjacent to the convex face of lens 22.

In operation, the lateral shift of the image beam 32 as it progresses through the system is illustrated in Figure 2 and is substantially the same as that of Figure 1, i.e., substantially the same as in the said Patent No. 2,769,367. Lenses 22 and 30 function as a variable optical wedge, corresponding to 11 and 15 of Figure 1. Prism 25 and air spaces 27 comprise the double element refractor corresponding to 9 and 12 of Figure 1, and the triplet 20, 21, 22 functions as a second variable wedge and image forming lens, corresponding to 11, 14 and 5 of Figure 1.

The portion of the system comprising the last two elements is afocal. If desired, the lens 30 may consist of glass of different dispersion and thus be used for improving the correction of longitudinal chromatic aberration.

In a second embodiment of this invention, the lens 30 may be given power, for instance, negative power for serving as a field flattener in conjunction with a lens of the Petzval type, as illustrated in Figure 3.

Clearly the system of Figure 3 is in most respects the same as that of Figure 2. Like parts are, therefore, designated by the same reference numerals. As shown in the figure, however, the triplet 20, 21, 22 has been replaced by a Petzval type lens comprising first doublet 33, 34 and second doublet 35, 36 and lens 30 has been replaced by field flattener 37. Lens 36 of the second doublet is designed to function both as an element of the image forming lens and as an element of compensator 24, as in the embodiment of Figure 2. The effect of the lenses and air spaces on the image beams 32 is illustrated in Figure 3 and is clearly substantially the same as that of Figure 2.

From the above it is clear that the system of Patent No. 2,769,367 has been simplified in that fewer optical elements are now required to achieve the desired result since one element of the image forming lens performs not only its usual function but further functions as an element of the compensator.

Obviously many modifications and variations of the present invention are possible in the light of the above teachings. It is therefore to be understood that, within the scope of the appended claims, the invention may be practiced otherwise than as specifically described.

What is claimed is:

1. An optical system comprising an image forming lens and an image motion compensator, said compensator comprising at least two plane-parallel refracting elements of different refractive indices arranged in abutting relationship along the optical axis of the system and being rotatable as a unit about an axis perpendicular to and lying on the said optical axis thereby providing a two-element rotatable refractor, a variable optical wedge disposed on each opposite side of said rotating refractor along said optical axis, one of said optical wedges comprising a movable plano convex lens the convex surface of which lies on a circle having its center on the axis of rotation of said rotating refractor, said movable lens further forming a lens element of said image forming lens, said other wedge comprising an identical movable plano convex lens and a second lens fixed adjacent thereto on the optical axis of said optical system, the refractive index of each of said plano convex lenses and of said second lens being the same but different from the refractive indices of said rotating refractor, the refractive index of one element of said rotating refractor being substantially greater than the refractive index of said lenses and the refractive index of the other element of said refractor being less than the refractive index of said lenses, means for rotating said refractor and said movable lenses in synchronism, said variable optical wedges refracting said image beam in opposite directions whereby the result of refraction by said wedges and by said refractor is a lateral displacement of said image beam, said wedges further providing a medium embracing said rotating refractor having a refractive index with respect to which one element of said refractor has a relative index of refraction greater than unity and with respect to which the other element of said refractor has a relative index of refraction less than unity.

2. The system of claim 1 wherein said image forming lens comprises a triplet lens and said movable plano convex lens forming a lens element thereof comprises the third element thereof.

3. The system of claim 1 wherein said image forming lens comprises a Petzval lens and said movable plano convex lens forming a lens element thereof comprises an element of the second doublet.

References Cited in the file of this patent

UNITED STATES PATENTS 2,769,367     Schwesinger _____ Nov. 6, 1956